(12) United States Patent
Tanaka et al.

(10) Patent No.: US 6,856,369 B2
(45) Date of Patent: Feb. 15, 2005

(54) ELECTRODE SUBSTRATE FOR LIQUID CRYSTAL DISPLAY PANEL, METHOD OF FABRICATING THE ELECTRODE SUBSTRATE, AND LIQUID CRYSTAL DISPLAY PANEL

(75) Inventors: Tomio Tanaka, Shinjuku-Ku (JP); Akio Sonehara, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 10/096,845

(22) Filed: Mar. 14, 2002

(65) Prior Publication Data

US 2002/0131002 A1 Sep. 19, 2002

(30) Foreign Application Priority Data

Mar. 15, 2001 (JP) ........................................ 2001-074254

(51) Int. Cl.[7] .............................................. G02F 1/1343
(52) U.S. Cl. ........................................................ 349/139
(58) Field of Search ................................ 349/145, 139, 349/42, 106

(56) References Cited

U.S. PATENT DOCUMENTS

| | | | |
|---|---|---|---|
| 4,834,507 A | * | 5/1989 | Kato et al. ................... 349/145 |
| 5,535,028 A | * | 7/1996 | Bae et al. .................... 349/145 |
| 5,610,736 A | * | 3/1997 | Asai ............................. 349/42 |
| 6,437,847 B1 | * | 8/2002 | Kishimoto ................... 349/155 |
| 6,570,639 B1 | * | 5/2003 | Manabe et al. ............. 349/190 |

* cited by examiner

Primary Examiner—Robert H. Kim
Assistant Examiner—Richard H Kim
(74) Attorney, Agent, or Firm—Parkhurst & Wendell, L.L.P.

(57) ABSTRACT

A pixel electrode substrate includes a glass substrate, parallel signal lines formed on the glass substrate, parallel gate lines formed perpendicularly to the signal lines on the glass substrate, and a plurality of TFTs disposed near the intersections of the signal lines and gate lines. A color filter layer and pixel electrodes are formed in that order over pixel regions defined by the signal lines and the gate lines on the glass substrate. The pixel electrodes and the color filter layer form color stripes. Each of the signal lines has offset sections formed near the intersections of the signal line and the gate lines with their center axes dislocated laterally from a center axis of the signal line such that the switching devices are disposed in dark regions outside color regions corresponding to the color layer. The pixel electrodes have projections projecting from the color regions into the dark regions, respectively, and the projections are connected to the switching devices in the dark regions.

4 Claims, 6 Drawing Sheets

ELECTRODE SUBSTRATE FOR LIQUID CRYSTAL DISPLAY PANEL, METHOD OF FABRICATING THE ELECTRODE SUBSTRATE, AND LIQUID CRYSTAL DISPLAY PANEL

BACKGROUND OF THE INVENTION

1. Field of the Invention

The present invention relates to a color liquid crystal display panel capable of displaying color pictures and, more particularly, to a liquid crystal display panel of color-filter-on-array construction (COA construction) having a pixel electrode substrate provided with pixel electrodes, thin-film transistors (TFTS) and a color filter layer.

2. Description of the Related Art

A conventional color liquid crystal display panel of COA construction has a pair of electrode substrates, i.e., a pixel electrode substrate and a counter electrode substrate, a liquid crystal layer held between the pair of electrode substrates, and a color filter layer formed on the pixel electrode substrate provided with pixel electrodes and TFTs. In the pixel electrode substrate of this color liquid crystal display panel of COA construction, the TFTs, the color filter layer and the pixel electrodes are stacked in that order on a glass substrate.

Figure 6:
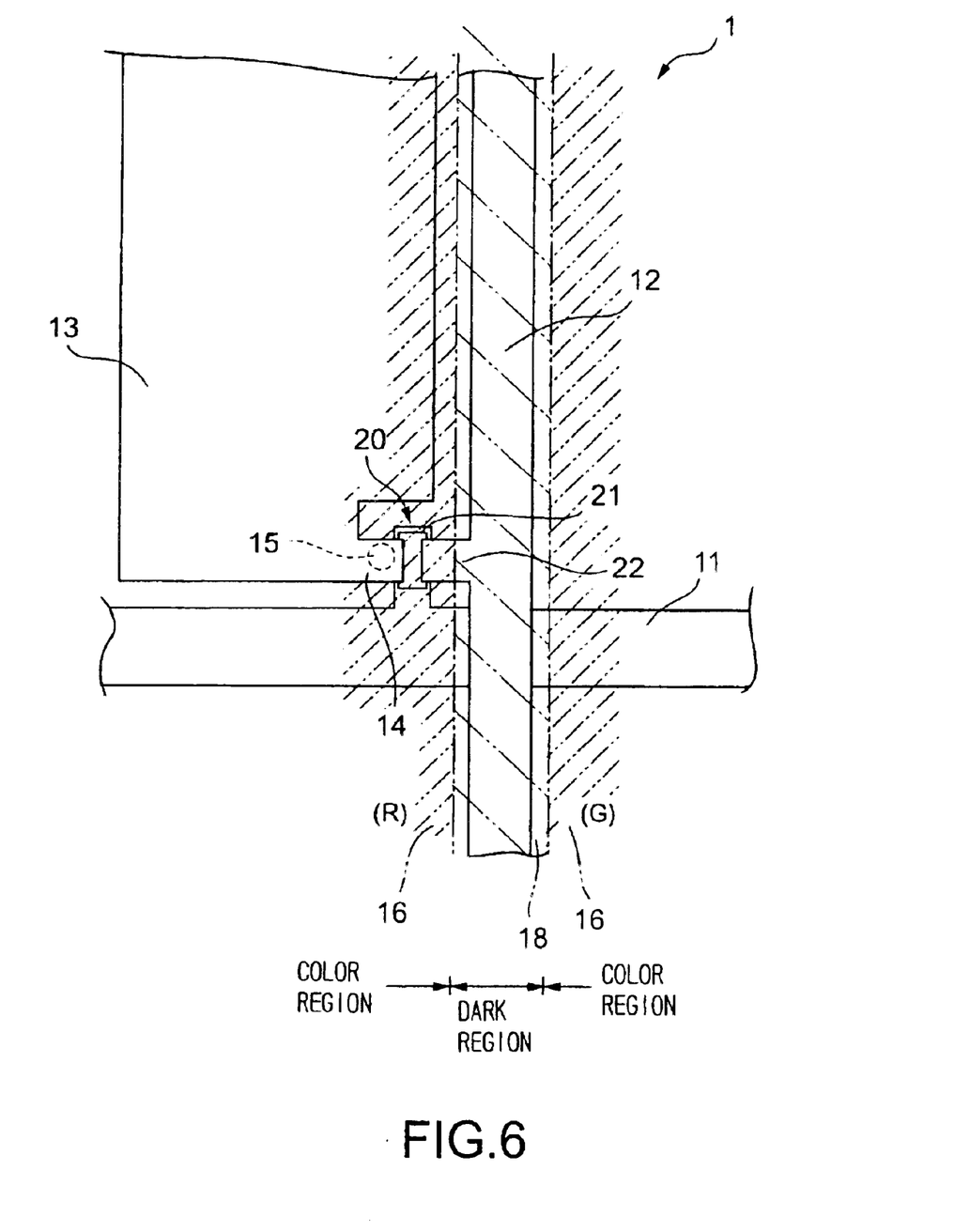
FIG. 6 is a schematic, fragmentary plan view of a conventional pixel electrode substrate for a liquid crystal display panel.

Referring to FIG. 6 showing a conventional pixel electrode substrate 1 in a schematic plan view, a gate line 11 and a signal line 12 are formed perpendicularly to each other on the glass substrate. A TFT 20 is formed on the glass substrate at a position near the intersection of the gate line 11 and the signal line 12. It is noted that the pixel electrode substrate 1 is provided with a plurality of gate lines 11, signal lines 12 and TFTs 20 (refer to FIG. 3 associated with the present invention); however, only one unit of arrangements of the pixel electrode substrate 1 is shown in FIG. 6.

As shown in FIG. 6, each TFT 20 has a gate electrode 21 laterally extending from the gate line 11, and a drain electrode 22 laterally extending from the signal line 12. A color filter layer (color layer) 16 and pixel electrodes 13 are stacked in that order on the TFTs 20 (refer to FIG. 2 associated with the present invention). The pixel electrodes 13 and the color segments of the color filter layer 16 form stripe-shaped color regions. The color filter layer 16 has red color segments (R color segments), green color segments (G color segments) and blue color segments (B color segments). The R, the G and the B color segments are arranged successively in a direction parallel to the gate lines 11 (refer to FIG. 3 associated with the present invention). Protective strips 18 are interposed in regions each extending between the adjacent color segments of the color filter layer 16, respectively.

Incidentally, the pixel electrodes 13 and the color segments of the color filter layer 16 must be formed as close to the signal lines 12 and the gate lines 11 as possible to provide the liquid crystal display panel with a high array aperture ratio. Therefore, the TFTs 20 are formed in stripe-shaped color regions as shown in FIG. 6.

In this conventional liquid crystal display panel, however, since the pixel electrodes 13 are connected to the TFTs 20 in the stripe-shaped color regions, contact holes 15 must be formed in parts of the color filter layer 16 between the pixel electrodes 13 and the TFTs 20 or the color filter 16 must be formed so as to extend around the source electrodes of the TFTs 20, which requires precision processing techniques and advanced alignment techniques. The color filter layer 16 can be formed by a printing method. For example, a color pattern formed on a predetermined base may be transferred to the glass substrate by a gravure printing method. However, the color pattern to be transferred to the glass substrate must be provided with holes corresponding to the contact holes 15, and the holes of the color pattern must be correctly aligned with the contact holes 15 formed on the glass substrate when transferring the color pattern to the glass substrate, which requires a precision alignment technique.

SUMMARY OF THE INVENTION

The present invention has been made in view of the foregoing problems and it is therefore an object of the present invention to provide an electrode substrate that enables a liquid crystal display panel of COA construction to be fabricated easily at low costs, a method of fabricating such an electrode substrate, and a liquid crystal display panel including such an electrode substrate.

According to a first aspect of the present invention, an electrode substrate for a liquid crystal display panel includes: a transparent substrate; a plurality of parallel signal lines formed on the transparent substrate; a plurality of parallel gate lines formed perpendicularly to the signal lines on the transparent substrate; a plurality of switching devices formed on the transparent substrate at positions near intersections of the signal lines and the gate lines; a color layer having a plurality of color segments and formed with the color segments being coinciding with pixel regions, each of the pixel regions being defined by the signal lines and the gate lines; and a plurality of pixel electrodes formed on the color layer with the pixel electrodes respectively corresponding to the pixel regions. In this electrode substrate, each of at least either the signal lines or the gate lines has offset sections formed near the intersections of the signal lines and the gate lines with center axes of the offset sections being dislocated laterally from a corresponding center axis of the signal line or the gate line such that the switching devices are disposed in dark regions outside color regions corresponding to the color segments of the color layer. In addition, the pixel electrodes have projections projecting from the color regions into the dark regions, respectively; and the projections are connected to the switching devices in the dark regions, respectively.

Preferably, the color segments of the color layer may be in striped-shape so as to cover a plurality of adjacent pixel regions.

According to a second aspect of the present invention, a method of fabricating an electrode plate for a liquid crystal display panel includes the steps of: forming, on a transparent substrate, a plurality of parallel gate lines and a plurality of parallel signal lines disposed perpendicularly to the gate lines, so that each of at least either the signal lines or the gate lines has offset sections formed near intersections of the signal lines and the gate lines with center axes of the offset sections being dislocated laterally from a corresponding center axis of the signal line or the gate line; forming a plurality of switching devices on the transparent substrate at positions near intersections of the signal lines and the gate lines; forming a color layer having a plurality of color segments with the color segments being coinciding with pixel regions, each of the pixel regions being defined by the signal lines and the gate lines; and forming a plurality of pixel electrodes respectively having projections projecting from color regions, corresponding to the color segments of the color layer, into dark regions outside the color regions, so that the projections are connected to the switching devices in the dark regions, respectively.

According to a third aspect of the present invention, a liquid crystal display panel includes: a pair of electrode substrates disposed opposite to each other; and a liquid crystal layer held between the pair of electrode substrates. In this liquid crystal display panel, at least one of the pair of electrode substrates includes: a transparent substrate; a plurality of parallel signal lines formed on the transparent substrate; a plurality of parallel gate lines formed perpendicularly to the signal lines on the transparent substrate; a plurality of switching devices formed on the transparent substrate at positions near intersections of the signal lines and the gate lines; a color layer having a plurality of color segments and formed with the color segments being coinciding with pixel regions, each of the pixel regions being defined by the signal lines and the gate lines; and a plurality of pixel electrodes formed on the color layer with the pixel electrodes respectively corresponding to the pixel regions. In this electrode substrate of the liquid crystal display panel, each of at least either the signal lines or the gate lines has offset sections formed near the intersections of the signal lines and the gate lines with center axes of the offset sections being dislocated laterally from a corresponding center axis of the signal line or the gate line such that the switching devices are disposed in dark regions outside color regions corresponding to the color segments of the color layer. In addition, the pixel electrodes have projections projecting from the color regions into the dark regions, respectively; and the projections are connected to the switching devices in the dark regions, respectively.

According to the present invention, each of at least either the signal lines or the gate lines has the offset sections formed near intersections of the signal lines and the gate lines so as to extend with their center axes being dislocated laterally from the corresponding center axis of the signal line or the gate line such that the switching devices are formed in the dark regions outside the color regions. Therefore, the switching devices can be connected to the projections of the pixel electrodes in the dark regions, and hence any contact holes do not need to be formed in the sections of the color layer interposed between the pixel electrodes and the switching devices. Also, the color layer does not need to be formed so as to extend around the source electrodes of the switching devices. Accordingly, a liquid crystal display panel of COA construction can be easily fabricated at low costs without requiring precision processing techniques and alignment techniques.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

A liquid crystal display panel 10 provided with a pixel electrode substrate 1 in a preferred embodiment of the present invention will be described with reference to FIG. 2. The liquid crystal display panel 10 includes a pair of electrode substrates, i.e., the pixel electrode substrate 1 and a counter electrode plate 2, disposed opposite to each other, and a liquid crystal layer 3 sandwiched between the pixel electrode substrate 1 and the counter electrode substrate 2. The pixel electrode substrate 1 is provided with pixel electrodes 13 and TFTs (switching devices) 20.

Figure 1:
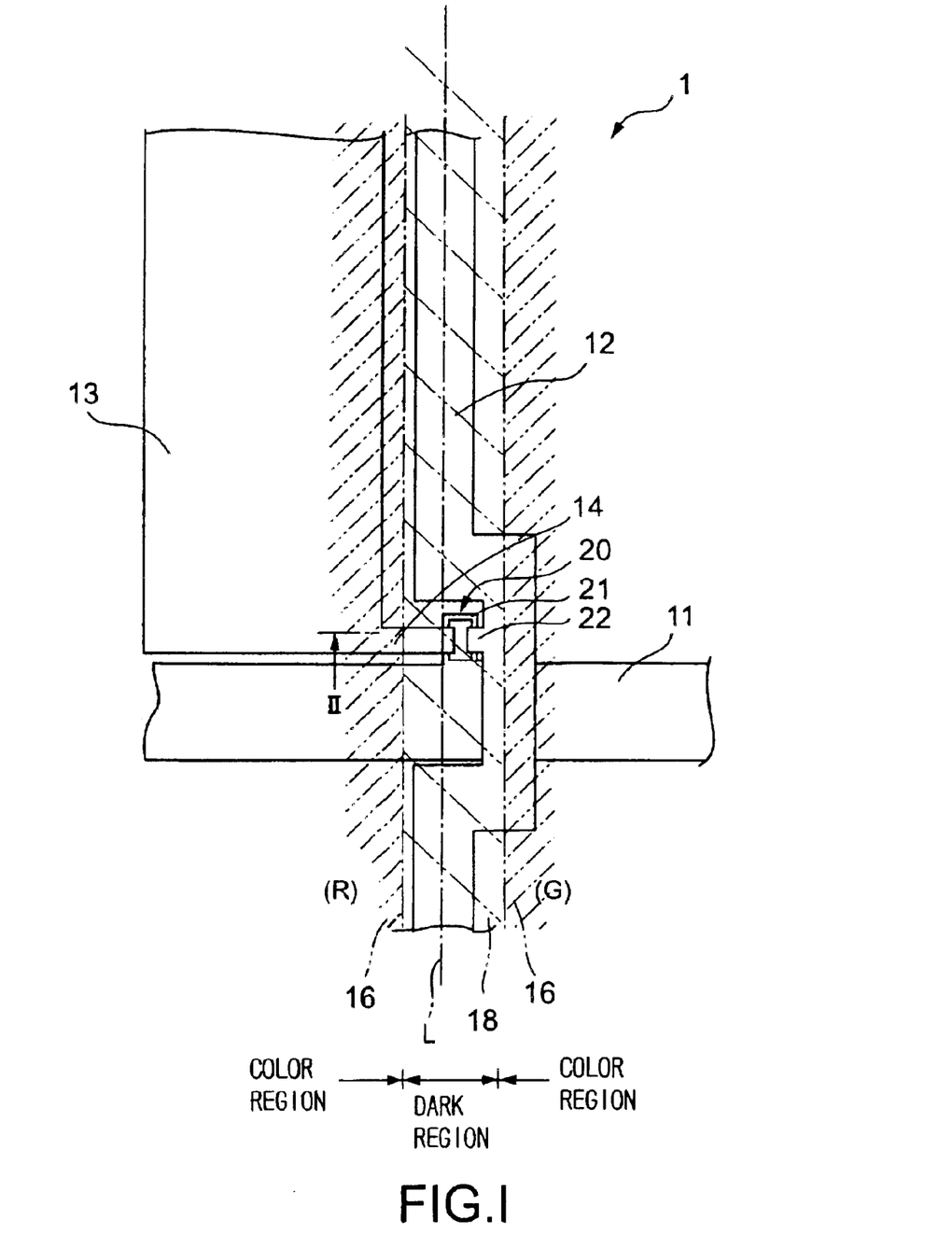
FIG. 1 is a schematic, fragmentary plan view of an electrode substrate (pixel electrode substrate) in a preferred embodiment of the present invention for a liquid crystal display panel.

The pixel electrode substrate 1 will be described with reference to FIGS. 1 through 3. Referring to FIGS. 1 and 2, the pixel electrode substrate 1 has a glass substrate (transparent substrate) 4, parallel signal lines 12 formed on the glass substrate 4, and parallel gate lines 11 formed on the glass substrate 4 perpendicularly to the signal line 12s. TFTs 20 are formed on the glass substrate 4 at positions near the intersections of the gate lines 11 and the signal lines 12. As shown in FIG. 3, the pixel electrode substrate 1 is provided with a plurality of gate lines 11, signal lines 12 and TFTs 20; however, for clarification of explanation, only one unit of arrangements of the pixel electrode substrate 1 is shown in FIGS. 1 and 2.

Figure 2:
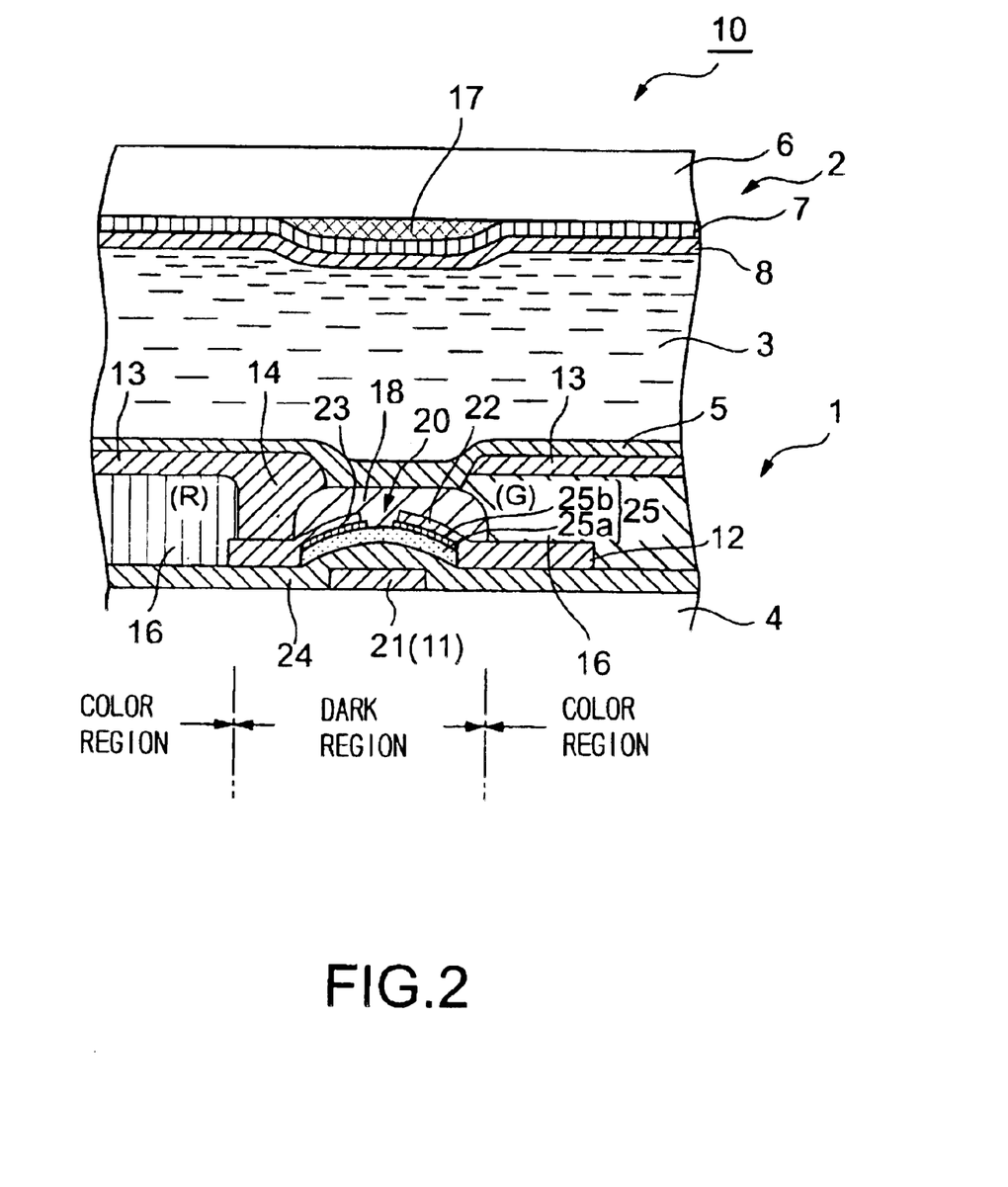
FIG. 2 is a schematic sectional view of a liquid crystal display panel provided with the pixel electrode substrate shown in FIG. 1, corresponding to a section on line II—II in FIG. 1.
Figure 3:
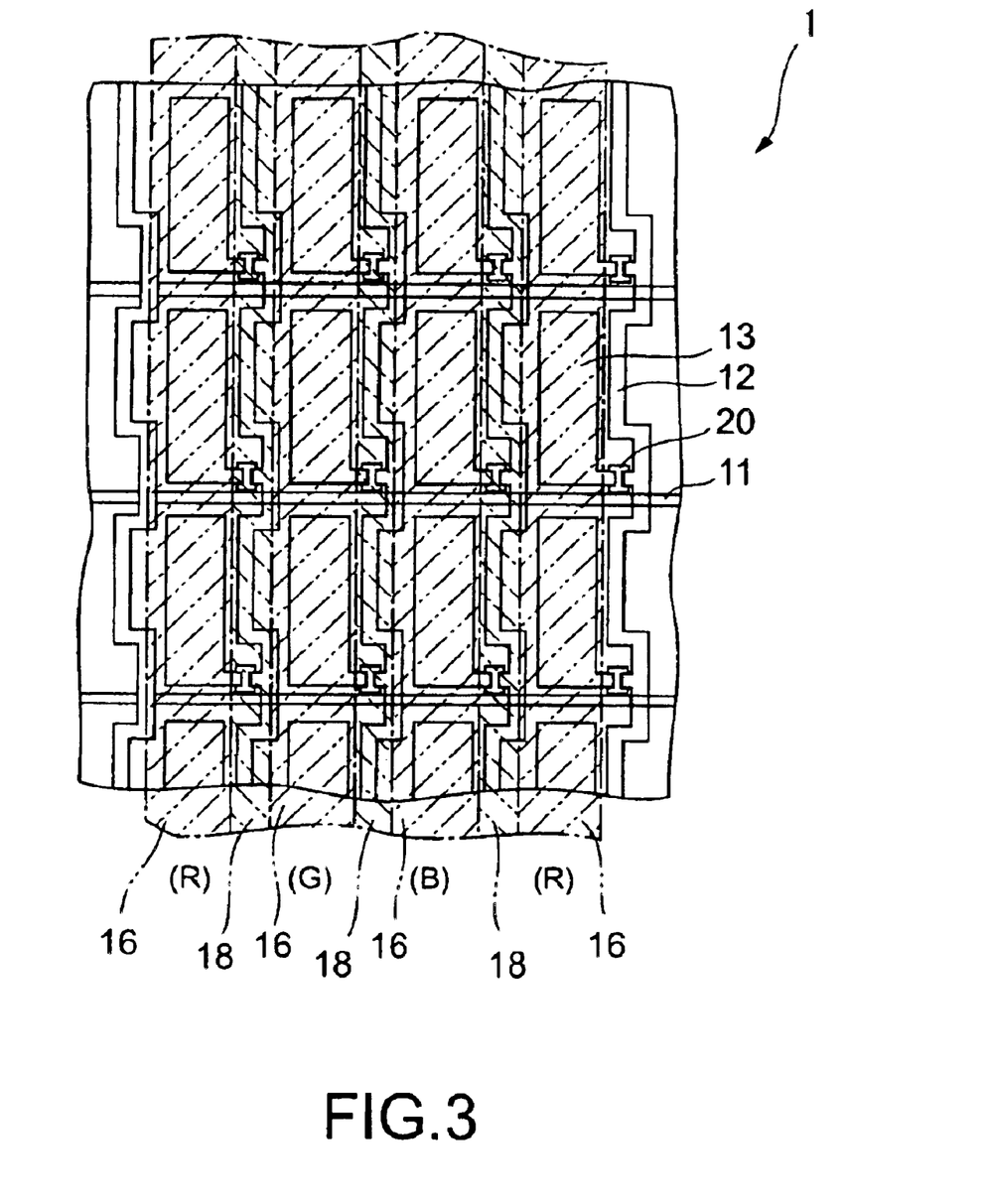
FIG. 3 is a schematic general plan view of an electrode substrate (pixel electrode substrate) in a preferred embodiment of the present invention for a liquid crystal display panel.

As best shown in FIG. 2, the gate lines 11 are formed directly on the glass substrate 4, an insulating film 24 is formed on the glass substrate 4 so as to cover the gate lines 11, and the signal lines 12 are formed on the insulating film 24. Each TFT 20 has a gate electrode 21 laterally projecting from the gate line 11, an insulating film 24 and a semiconductor film 25 formed in that order over the gate electrode 21, a drain electrode 22 (a part of the signal line 12 laterally projecting from the signal line 12), and a source electrode 23. The insulating film 24 is a silicon nitride ($SiN_x$ film), the semiconductor film 25 is a laminated film consisting of an amorphous silicon film (a-Si film) 25 and an n-type a-Si film 25b. The semiconductor film 25 is connected electrically through the drain electrode 22 and the source electrode 23 to the signal line 12 and the pixel electrode 13, respectively.

A color filter layer (color layer) 16 and the pixel electrodes 13 are formed in that order in pixel regions surrounded by the gate lines 11 and the signal lines 12. The color segments of the color filter layer 16 are in striped-shape so as to cover adjacent pixel regions. The pixel electrodes 13 and the color segments of the color filter layer 16 form stripe-shaped color regions. The color filter layer 16 has red color segments (R color segments), green color segments (G color segments) and blue color segments (B color segments). As shown in FIG. 3, the R, the G and the B color segments are arranged successively in a direction parallel to the gate lines 11. Protective strips 18 are formed in dark regions each extending between the adjacent color segments of the color filter layer 16, respectively.

As shown in FIG. 1, each of the signal lines 12 has offset sections formed near the intersections of the signal line 12 and the gate lines 11 so as to extend with their center axes dislocated laterally from the center axis (or extending axis) L of the signal line 12 so that the TFTs 20 are disposed in the dark regions outside the color regions. Each pixel electrode 13 has a projection 14 projecting from the color segments of color filter layer 16 into the dark region, and the projection 14 is connected to the TFT 20 in the dark region.

Referring again to FIG. 2, an alignment layer 5 is formed over the inner surface contiguous with the liquid crystal layer 3 of the pixel electrode substrate 1. The counter electrode substrate 2 has a glass substrate 6, counter electrodes 7 formed on the glass substrate 6, and an alignment layer 8 formed over the counter electrodes 7. Stripes of a screening layer 17 are formed over regions corresponding to the dark regions of the pixel electrode substrate 1 of the glass substrate 6.

A method of fabricating the liquid crystal display panel 10 will be described with reference to FIGS. 1 through 3. A chromium film (Cr film) is deposited on the glass substrate 4 by a sputtering process, and then the Cr film is patterned by a photolithographic process to form the gate lines 11 and the gate electrodes 21. Then, the insulating film 24 of $SiN_x$, the semiconductor film 25a of a-Si, and the semiconductor film 25b of n-type a-Si are formed by CVD processes. A Cr film is formed over the semiconductor film 25b, and the Cr film is patterned by a photolithographic process to form the signal lines 12, the source electrodes 23 and the drain electrodes 22. The gate electrodes 21, the semiconductor films 25a and 25b of a-Si, the source electrodes 23 and the drain electrode 22 form the TFTs 20. The parallel gate lines 11 and the parallel signal lines 12 are formed on the glass substrate 4 so as to extend perpendicularly to each other. Each of the signal lines 12 is formed such that the offset sections are formed near the intersections of the signal line 12 and the gate lines 11 so as to extend with their axes dislocated laterally from the center axis L of the signal line 12 so that the TFTs 20 are disposed in the dark regions outside color regions.

Then, the color filter layer 16 having the R, the G and the B color stripes is formed by processing a red film of a photosensitive polymer containing a red pigment, a green film of a photosensitive polymer containing a green pigment, and a blue film of a photosensitive polymer containing a blue pigment by photolithographic processes. An ITO film is formed over the color filter layer 16 and the TFTs 20 by a sputtering process, and then the ITO film is patterned by a photolithographic process to form the pixel electrodes 13 and the projections 14 connected to the TFTs 20 in the dark regions.

An insulating film is formed over the elements formed on the glass substrate 4, and the insulating film is patterned to form the protective strips 18. Subsequently, the alignment layer 5 is formed over the inner surface to be exposed to the liquid crystal layer 3 of the pixel electrode substrate 1, and the surface of the alignment layer 5 is rubbed by an aligning process.

The counter electrode substrate 2 to be disposed opposite to the pixel electrode substrate 1 is fabricated by forming the screening layer 17 and the counter electrodes 7 on the glass substrate 6, forming the alignment layer 8 over the counter electrodes 7, and rubbing the surface of the alignment layer 8 by an aligning process.

The pixel electrode substrate 1 and the counter electrode substrate 2 are disposed opposite to each other with a spacer held between the pixel electrode substrate 1 and the counter electrode substrate 2, a liquid crystal is poured into a space between the pixel electrode substrate 1 and the counter electrode substrate 2 to form the liquid crystal layer 3, and the space between the pixel electrode substrate 1 and the counter electrode substrate 2 is sealed to complete the liquid crystal display panel 10.

Since each of the signal lines 12 has offset sections formed near the intersections of the signal line 12 and the gate lines 11 so as to extend with their center axes dislocated laterally from the center axis L of the signal line 12 so that the TFTs 20 are disposed in the dark regions outside color regions, the projections 14 of the pixel electrodes 13 can be connected to the TFTs 20 in the dark regions, respectively. Therefore, any contact holes do not need to be formed in the sections of the color filter layer 16 interposed between the pixel electrodes 13 and the TFTs 20, and the color filter layer 16 does not need to be formed so as to extend around the source electrodes 23 of the TFTs 20. Accordingly, the liquid crystal display panel 10 of COA construction can be easily fabricated at low costs without requiring precision processing techniques and alignment techniques.

Figure 4:
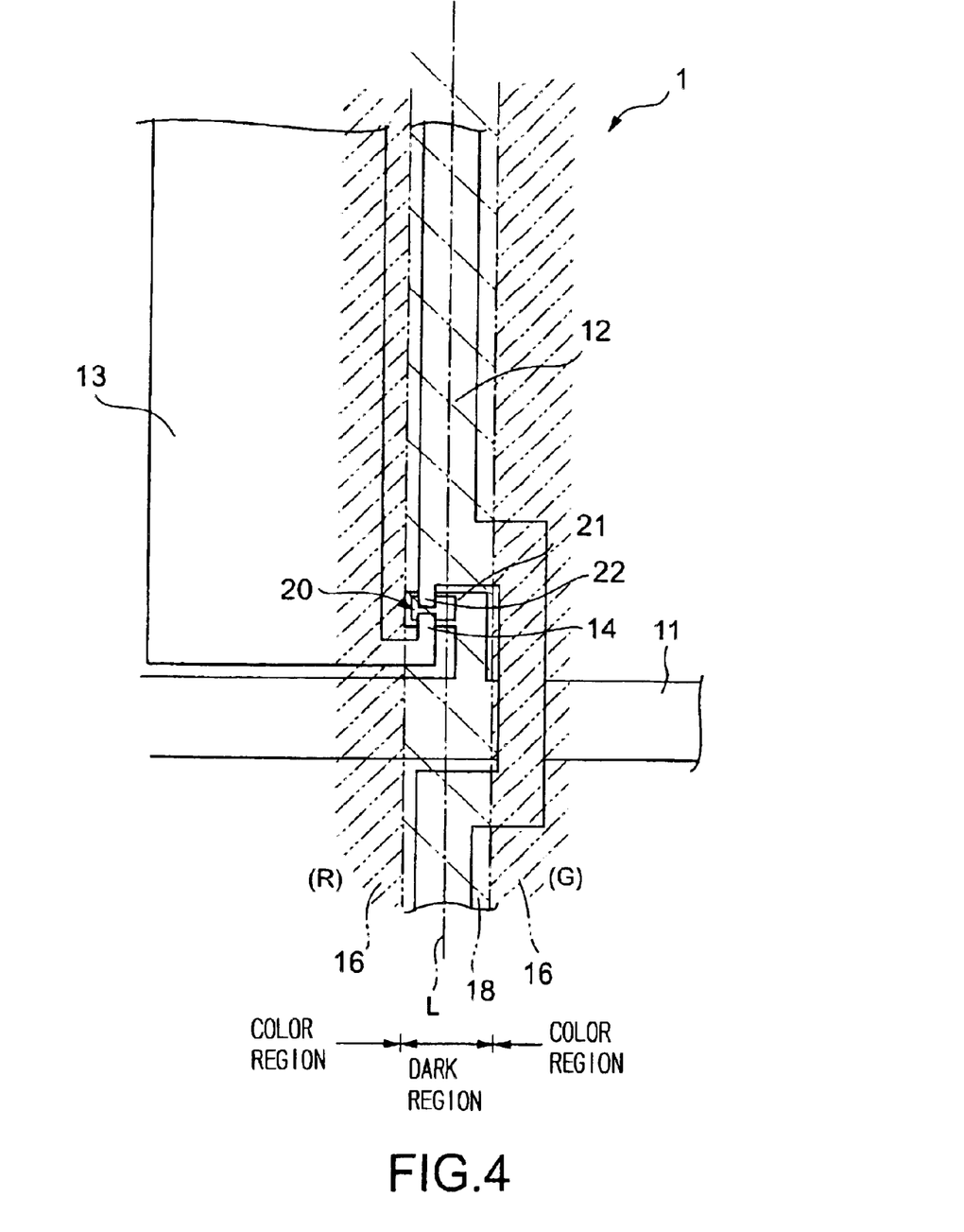
FIG. 4 is a schematic, fragmentary plan view of a pixel electrode substrate in a first modification of the pixel electrode substrate shown in FIG. 1.

In the foregoing embodiment, the shapes and directions of the gate electrodes 21, the drain electrodes 22 and the source electrodes 23, and the shape and direction of the projections 14 of the pixel electrodes 13 connected to the TFTs 20 are not limited to those shown in FIG. 1 and are subject to change (FIG. 4).

Figure 5:
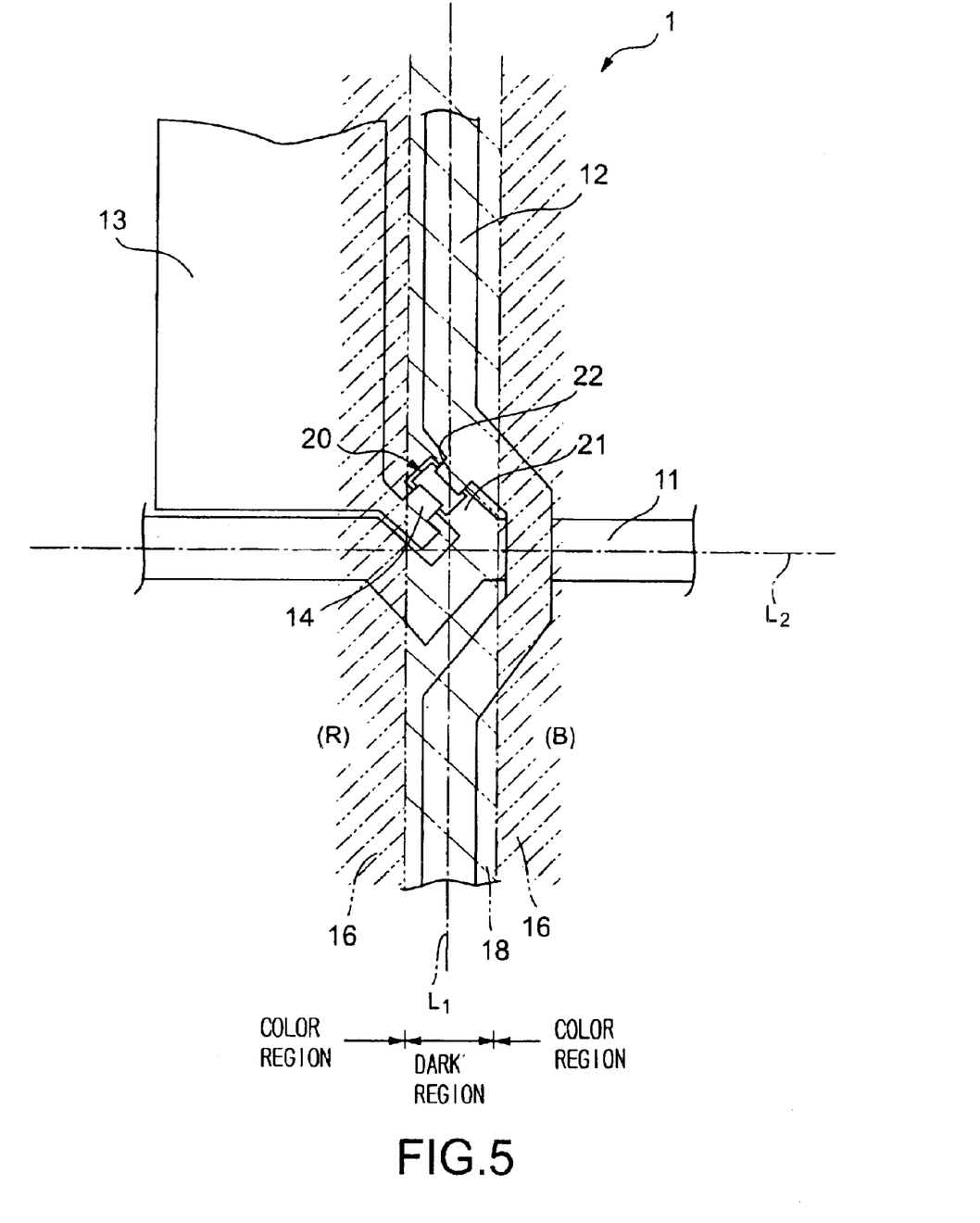
FIG. 5 is a schematic, fragmentary plan view of a pixel electrode substrate in a second modification of the pixel electrode substrate shown in FIG. 1.

Although each of the signal lines 12 formed on the glass substrate 4 has the offset sections formed near the intersections of the signal line 12 and the gate lines 11 so as to extend with their center axes dislocated laterally from the center axis L of the signal line 12 in the foregoing embodiment, each of the gate lines 11 formed on the glass substrate 4 may have offset sections formed near the intersections of the gate line 11 and the signal lines 12 so as to extend with their center axes dislocated laterally from the center axis of the gate line 11 or each of the signal lines 12 and each of the gate lines 11 have offset sections formed so as to extend with their center axes dislocated laterally from the respective center axes L1 and L2 of the signal line 12 and the gate line 11, respectively, as shown in FIG. 5.

What is claimed is:

1. An electrode substrate for a liquid crystal display panel, comprising:

a transparent substrate;

a plurality of parallel signal lines formed on the transparent substrate;

a plurality of parallel gate lines formed perpendicularly to the signal lines on the transparent substrate;

a plurality of switching devices formed on the transparent substrate at positions near intersections of the signal lines and the gate lines;

a color layer having a plurality of color segments and formed with the color segments being coinciding with pixel regions, each of the pixel regions being defined by the signal lines and the gate lines, the pixel regions being arranged in a two-dimensional grid pattern; and a plurality of pixel electrodes formed on the color layer with the pixel electrodes respectively corresponding to the pixel regions;

wherein each of the color segments of the color layer and each of the pixel electrodes are stacked in that order on the transparent substrate, each of at least either the signal lines or the gate lines has offset sections formed near the intersections of the signal lines and the gate lines with center axes of the offset sections being dislocated laterally from a corresponding center axis of the signal line or the gate line such that the switching devices are disposed in dark regions outside color regions corresponding to the color segments of the color layer; the pixel electrodes have projections projecting from the color regions into the dark regions, respectively; and the projections are connected to the switching devices in the dark regions, respectively.

2. The electrode substrate according to claim 1, wherein the color segments of the color layer are in striped-shape so as to cover a plurality of adjacent pixel regions.

3. A method of fabricating an electrode substrate for a liquid crystal display panel, said method comprising the steps of:

forming, on a transparent substrate, a plurality of parallel gate lines and a plurality of parallel signal lines disposed perpendicularly to the gate lines, so that each of at least either the signal lines or the gate lines has offset sections formed near intersections of the signal lines and the gate lines with center axes of the offset sections being dislocated laterally from a corresponding center axis of the signal line or the gate line;

forming a plurality of switching devices on the transparent substrate at positions near intersections of the signal lines and the gate lines;

forming a color layer having a plurality of color segments with the color segments being stacked on the transparent substrate and coinciding with pixel regions, each of the pixel regions being defined by the signal lines and the gate lines, and the pixel regions being arranged in a two-dimensional grid pattern; and forming a plurality of pixel electrodes with the pixel electrodes being stacked on the color segments of the color layer, the pixel electrodes respectively having projections projecting from color regions, corresponding to the color segments of the color layer, into dark regions outside the color regions, so that the projections are connected to the switching devices in the dark regions, respectively.

4. A liquid crystal display panel, comprising:

a pair of electrode substrates disposed opposite to each other; and a liquid crystal layer held between the pair of electrode substrates;

at least one of said pair of electrode substrates including:
   a transparent substrate;
   a plurality of parallel signal lines formed on the transparent substrate;
   a plurality of parallel gate lines formed perpendicularly to the signal lines on the transparent substrate;
   a plurality of switching devices formed on the transparent substrate at positions near intersections of the signal lines and the gate lines;

a color layer having a plurality of color segments and formed with the color segments being coinciding with pixel regions, each of the pixel regions being defined by the signal lines and the gate lines, and the pixel regions being arranged in a two-dimensional grid pattern;

and a plurality of pixel electrodes formed on the color layer with the pixel electrodes respectively corresponding to the pixel regions;

wherein each of the color segments of the color layer and each of the pixel electrodes are stacked in that order on the transparent substrate; each of at least either the signal lines or the gate lines has offset sections formed near the intersections of the signal lines and the gate lines with center axes of the offset sections being dislocated laterally from a corresponding center axis of the signal line or the gate line such that the switching devices are disposed in dark regions outside color regions corresponding to the color segments of the color layer; the pixel electrodes have projections projecting from the color regions into the dark regions, respectively; and the projections are connected to the switching devices in the dark regions, respectively.

* * * * *